United States Patent
Di Fiore et al.

(10) Patent No.: US 9,564,648 B2
(45) Date of Patent: Feb. 7, 2017

(54) ANODE LEAK LOCATION DETECTION

(71) Applicant: GM GLOBAL TECHNOLOGY OPERATIONS LLC, Detroit, MI (US)

(72) Inventors: Daniel C. Di Fiore, Scottsburg, NY (US); Manish Sinha, Pittsford, NY (US); Steven R. Falta, Honeoye Falls, NY (US); Matthew A. Lang, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 383 days.

(21) Appl. No.: 13/706,781

(22) Filed: Dec. 6, 2012

(65) Prior Publication Data
US 2014/0162171 A1   Jun. 12, 2014

(51) Int. Cl.
*H01M 8/04313* (2016.01)
*H01M 8/04791* (2016.01)
(Continued)

(52) U.S. Cl.
CPC ....... *H01M 8/04664* (2013.01); *H01M 8/0444* (2013.01); *H01M 8/04313* (2013.01); *H01M 8/04679* (2013.01); *H01M 8/04753* (2013.01); *H01M 8/04791* (2013.01); *H01M 8/04798* (2013.01); *H01M 8/0441* (2013.01); *H01M 8/04097* (2013.01); *H01M 8/04395* (2013.01); *H01M 8/04402* (2013.01); *H01M 8/04992* (2013.01); *H01M 2008/1095* (2013.01); *Y02E 60/50* (2013.01)

(58) Field of Classification Search
None
See application file for complete search history.

(56) References Cited

U.S. PATENT DOCUMENTS 6,156,447 A * 12/2000 Bette et al. ............... 429/432
6,535,827 B1 * 3/2003 Lestina ............... F17D 5/02
                                                    137/486
(Continued)

FOREIGN PATENT DOCUMENTS

WO    WO 2010067128 A1 *  6/2010

OTHER PUBLICATIONS

An et al., Model based detection of hydrogen leaks in a fuel cell stack; 44th IEEE Conference 2005; 6 pages total.*

(Continued)

*Primary Examiner* — Ula C Ruddock
*Assistant Examiner* — Anna Korovina
(74) *Attorney, Agent, or Firm* — John A. Miller; Miller IP Group, PLC

(57) ABSTRACT

A system and method for quantifying an anode leak location in a fuel cell system. The system and method include determining there is a leak in an anode sub-system of a fuel cell stack and estimating a first effective leak area using a first leak flow value and first operating parameters. The system and method also include increasing airflow to a cathode side of the fuel cell stack and estimating a second leak effective area using a second leak flow value and second operating parameters. The system and method further include comparing the first leak effective area to the second leak effective area and determining an anode outflow leak location based on the comparison between the first and second leak effective areas.

15 Claims, 2 Drawing Sheets

(51) Int. Cl.
*H01M 8/0444* (2016.01)
*H01M 8/04* (2016.01)
*H01M 8/10* (2016.01)

(56) References Cited

U.S. PATENT DOCUMENTS

| | | | |
|---|---|---|---|
| 2002/0025464 A1* | 2/2002 | Breuer | H01M 8/04089 |
| | | | 429/416 |
| 2005/0214604 A1* | 9/2005 | Goto et al. | 429/22 |
| 2006/0162428 A1* | 7/2006 | Hu et al. | 73/40.7 |
| 2006/0210849 A1* | 9/2006 | Bono | 429/22 |
| 2008/0141760 A1* | 6/2008 | Sienkowski et al. | 73/40.5 R |
| 2008/0184780 A1* | 8/2008 | Farnsworth | 73/40.5 R |
| 2009/0255326 A1* | 10/2009 | Booden et al. | 73/40.5 R |
| 2010/0310955 A1* | 12/2010 | Yadha et al. | 429/429 |
| 2011/0097635 A1* | 4/2011 | Quattrociocchi et al. | 429/428 |
| 2011/0138883 A1 | 6/2011 | Falta | |
| 2012/0156575 A1 | 6/2012 | Di Fiore | |
| 2016/0197366 A1* | 7/2016 | Pace | H01M 8/04104 |
| | | | 429/446 |

OTHER PUBLICATIONS

Steck, Leak area calculation, 2008 NPL; 2 pages total.*
Technical ToolBoxes, Pipeline Leak Detection Operational Improvements, an Overview of Currently Available Leak Detection Technologies and US Regulations/Standard; Pipeline Technology Conference Apr. 4-5, 2012; 34 pages total.*

* cited by examiner

US 9,564,648 B2

ANODE LEAK LOCATION DETECTION

BACKGROUND OF THE INVENTION

Field of the Invention

This invention relates generally to a system and method for determining the location of an anode leak in a fuel cell system and, more particularly, to a system and method for quantifying an anode leak location, an outflow location of the leak, and an effective area of the leak in a fuel cell system.

Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It is necessary to accurately determine the flow rate through bleed valves, drain valves, and possibly other valves, in the anode sub-system of a fuel cell system to know when to close the particular valve, as is well understood by those skilled in the art. Traditional valve orifice models work fairly well, but are subject to part-to-part variations because the models assume an effective area of the orifice. Further, the orifice model calculation also requires a difference between an inlet and outlet pressure to determine the flow. For certain known systems, this pressure differential is on the same order of magnitude as the error of the pressure sensors, which could lead to large estimation errors.

U.S. Pat. No. 8,387,441, entitled "Injector Flow Measurement for Fuel Cell Applications", filed Dec. 11, 2009, assigned to the assignee of this application and herein incorporated by reference, discloses a method for determining flow through a valve in a fuel cell system. An anode sub-system pressure is measured just before an injector pulse and just after the injector pulse, and a difference between the pressures is determined. This pressure difference, the volume of the anode sub-system, the ideal gas constant, the anode sub-system temperature, the fuel consumed from the reaction of the fuel cell stack during the injection event and the fuel cross-over through membranes in the fuel cells of the fuel cell stack are used to determine flow through a valve. U.S. Pat. No. 8,701,468, entitled "Flow Estimation Based on Anode Pressure Response in Fuel Cell System", filed Dec. 17, 2010, assigned to the assignee of this application and herein incorporated by reference, determines the flow of anode gas out of an anode sub-system, and is also capable of determining if there is a leak in the anode sub-system. However, the location of the leak and the effective area of the leak is not known. Thus, there is a need in the art for a way to quantify the anode leak location, the outlet flow location and the effective area of the leak so as to enable targeted remedial actions and adjustments to fuel cell system models.

SUMMARY OF THE INVENTION

In accordance with the teachings of the present invention, a system and method are disclosed for quantifying an anode leak location in a fuel cell system that includes determining there is a leak in an anode sub-system of a fuel cell stack and estimating a first effective leak area using a first leak flow value and first operating parameters. The system and method also include increasing airflow to a cathode side of the fuel cell stack and estimating a second leak effective area using a second leak flow value and second operating parameters. The system and method further include comparing the first leak effective area to the second leak effective area and determining an anode outflow leak location based on the comparison between the first and second leak effective areas.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for quantifying an anode leak location in a fuel cell system is merely exemplary in nature, and is in no way intended to limit the invention or its applications or uses. Particularly, the method discussed herein determines a flow of an anode gas out of the anode sub-system. However, the method will have application for determining the flow out of other closed systems.

Figure 1:
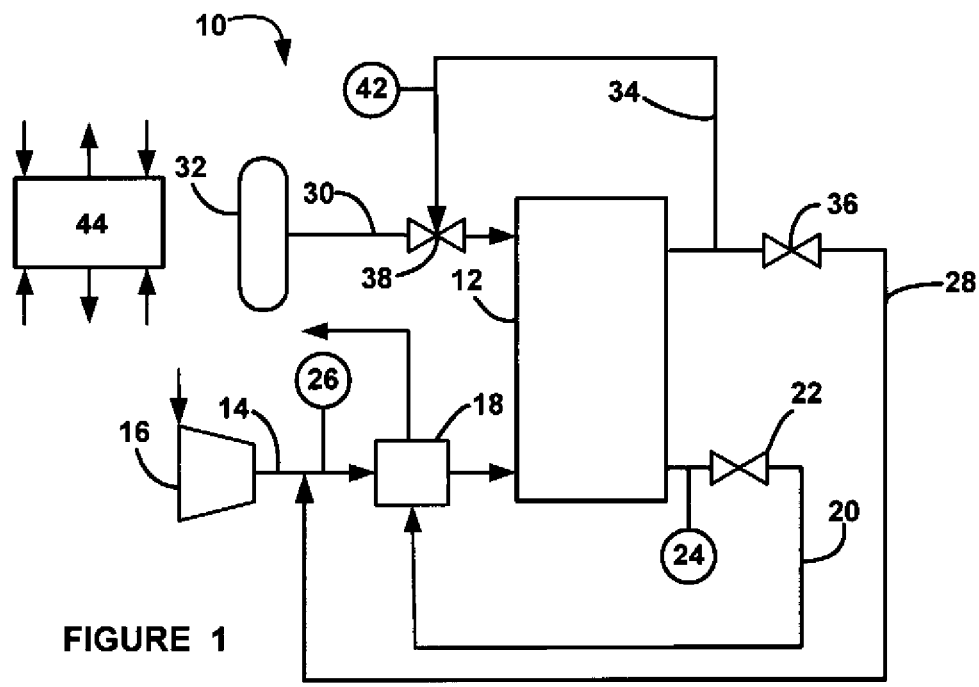
FIG. 1 is a schematic block diagram of a fuel cell system.

FIG. 1 is a schematic block diagram of a fuel cell system 10 including a fuel cell stack 12 with an anode side and a cathode side. A compressor 16 provides an airflow to the cathode side of the fuel cell stack 12 on a cathode input line 14 through a water vapor transfer (WVT) unit 18 that humidifies the cathode input air. Cathode exhaust gas is output from the stack 12 on a cathode exhaust gas line 20 through a backpressure valve 22. A pressure sensor 26 measures the pressure of the cathode inlet line 14 and a pressure sensor 24 measures the pressure of the cathode exhaust gas line 20, as described in more detail below.

The anode side of the fuel cell stack 12 receives hydrogen gas from a hydrogen source 32 on an anode input line 30 through a valve 38 and an anode recirculation gas on anode recirculation line 34 from an anode output of the stack 12 is provided to the valve 38. When a purge or bleed of the gases in the anode side of the stack 12 is desired, anode exhaust gas is bled into the cathode inlet line 14 through a valve 36 that is provided in an anode exhaust line 28. A pressure sensor 42 is provided in a location in the anode sub-system, such as in the anode recirculation line 34, to measure the pressure of the anode side of the stack 12. A controller 44 receives pressure signals from the pressure sensors 24, 26 and 42, and controls various fuel cell stack operations as well as various algorithms, as described in more detail below.

As discussed above, U.S. Pat. No. 8,701,468, incorporated by reference, determines the flow of anode gas out of an anode sub-system, and is also capable of determining if there is a leak in the anode sub-system. Currently, for each function the leak is assumed to be in the worst location for that function. For example, the emissions function assumes that the leak location is anode inlet to cathode outlet. This causes the remedial actions to be more conservative than they may need to be and can cause less efficient operation of the fuel cell system 10.

An algorithm has been developed that is basically an intrusive diagnostic to try to understand where an anode leak in the system 10 is located and to quantify the magnitude of the leak by altering operating conditions, thereby allowing for more accurate modeling of the leak rate and more precise handling of any remedial actions that are based on the leak. Before the algorithm described below, there was no way of modeling an anode leak. Thus, leak detection on a regular or constant basis was needed. However, this is difficult during high power operating conditions because of large errors that are inherent in previously known leak estimation methods. The algorithm allows for the leak location and the leak size to be quantified at conditions where leak detection resolution is high. This enables modeling of the leak in areas where leak detection is not as accurate and to take appropriate remedial actions based on the location of the leak. The algorithm also allows for predictive leak values at various operating conditions as well as improved nitrogen modeling and emissions estimations.

Figure 2:
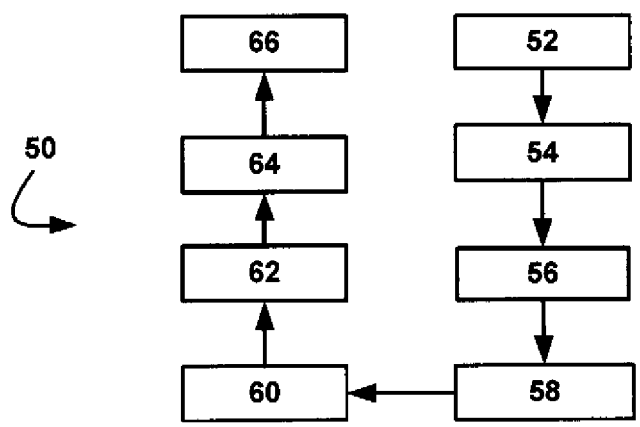
FIG. 2 is a flow diagram of a process for quantifying an anode leak location and the outflow location of the leak.

FIG. 2 is a flow chart diagram 50 showing a process for an algorithm that quantifies the anode leak location, i.e., determines whether the leak is in the anode inlet line 30 or the anode outlet line 28, and also quantifies the outlet flow location, i.e., cathode inlet, cathode outlet or ambient outlet flow location. To determine the location, the leak rate at a number of different operating points must be determined. This is best done at low power where the leak detection algorithm, discussed below, is most accurate. The main idea is to intrusively increase the cathode flow which would change the pressure drops in the cathode to help discriminate the leak location.

The motivation for detecting the anode leak location is to improve the anode gas concentration estimation by determining the anode leak location. It is also possible to target the appropriate remedial action for the leak. Example remedial actions include increasing compressor flow if the leak is to the cathode outlet where emissions are a concern or increasing the radiator airflow if a leak to ambient is detected. The following assumptions are made when determining the leak location: (1) the algorithm is an active diagnostic that is to be employed when a detected leak is not violating emissions, (2) there is a single leak location, and (3) the leak can be represented by an orifice flow. There are six potential leak paths from the anode to the cathode that may be detected by the algorithm above, which are given by the following table.

| Upstream Location | Downstream Location |
|---|---|
| Anode Inlet | Cathode Inlet |
| Anode Inlet | Cathode Outlet |
| Anode Inlet | Overboard |
| Anode Outlet | Cathode Inlet |
| Anode Outlet | Cathode Outlet |
| Anode Outlet | Overboard |

The algorithm begins by detecting a leak and calculating a leak flow value that defines a leak rate of the leak at box 52. Leak detection algorithms based on mass balance may be used, as described in U.S. Pat. Nos. 8,387,441 and 8,701,468, incorporated herein by reference. Once a leak has been detected at the box 52, the algorithm stores the leak flow value and other parameters at box 54. The leak flow value that is stored is at nominal operating conditions. For example, typical nominal operating conditions are: anode pressure=130 kPa, cathode inlet pressure=110 kPa, cathode outlet pressure=104 kPa, and ambient pressure=100 kPa with an anode hydrogen concentration of 0.7.

Once the leak flow value and other parameters are stored at the box 54, an effective leak area is estimated at box 56 to match the leak flow value for three different leak locations $A_i^{eff\_nom}$, where subscript i denotes three leak location cases, using the following:

$$A_i^{eff} = \frac{\sqrt{Mw_{AnOut}} \cdot \dot{n}_{Leak}}{P_{AnIn} \cdot \sqrt{\left(\frac{2 \cdot L2m^3}{R(T_{CoolIn} + C2K)}\right)\left(\frac{k}{k-1}\right)\left[\left(\frac{P_{CaIn}}{P_{AnIn}}\right)^{2/k} - \left(\frac{P_{CaIn}}{P_{AnIn}}\right)^{(k+1)/k}\right]}} \quad (1)$$

Where $Mw_{AnOut}$ is the molecular weight of the anode outlet gas, $\dot{n}_{Leak}$ is the rate of the leak, $P_{AnIn}$ is the pressure in the anode sub-system, R is the ideal gas constant (8.315 kPa-L/mol-K), $T_{CoolIn}$ is the temperature (K) of the coolant in the stack, C2K is a conversion factor from Celsius to Kelvin, L2 $m^3$ is a conversion factor from liters to cubic meters, k is the ratio of specific heat (approximately 1.4), and for the first leak location i the pressure of the cathode inlet, $P_{CaIn}$ is used. This same equation is used for the cathode outlet leak location in which case $P_{CaIn}$ is substituted for $P_{CaOut}$ (the pressure of the cathode exhaust gas), for the second leak location t. For the third leak location i, $P_{CaOut}$ is substituted for $P_{Amb}$ (pressure of the ambient environment). The system may measure ambient pressure using a pressure sensor (not shown), or may assume ambient pressure. The effective leak area of equation (1) above is used because it is assumed that the leak is similar to an orifice.

The three leak locations are (1) anode inlet to cathode outlet, (2) anode outlet to cathode inlet, and (3) anode to ambient environment. After the effective leak area for each of the three locations i, is estimated at the box 56, the cathode flow is increased to a calibratable value at box 58, where higher air flow is desirable because it increases the ability of the algorithm to discriminate the leak. Once the cathode flow has been increased at the box 58 the algorithm recalculates the leak flow value at the new operating conditions, which include increased cathode flow, and stores the new leak flow value and operating conditions at box 60. Typical new operating conditions are: anode pressure=170 kPa, cathode inlet pressure=150 kPa, cathode outlet pressure=120 kPa, and ambient pressure=100 kPa. After the leak flow at the new operating conditions has been recalculated and stored at the box 60, the three potential downstream leak locations i for an effective leak area $A_i^{eff\_hiCaFlow}$ are also estimated at the box 60 using equation (1). The three different potential downstream locations are: (1) the cathode outlet line 20, (2) the cathode inlet line 14 and (3) the ambient environment.

Next, each $A_i^{eff\_nom}$ leak location for i is compared with the corresponding leak location of i for $A_i^{eff\_hiCaFlow}$ to determine where the cathode leak location is at box 62, where the location that the compared data fits best is considered to be the downstream location of the leak. Exemplary compared data is shown in Table 1, below. For example, when comparing the estimated effective leak areas from the box 56 to the box 60 to determine the anode leak outlet location, the following sample data may apply.

Next, the cathode operating conditions are returned to normal, the anode hydrogen concentration is increased to close to 1, and a new leak flow value and estimated effective leak area $A_i^{eff\_nom}$ are stored at box 64. The stored leak flow values from the box 54 and the box 62 are used to calculate the three potential leak locations for $A_i^{eff\_nom}$ and $A_i^{eff\_nom}$ except now the molecular weight of the anode outlet gas will be closer to the molecular weight of hydrogen, and the anode leak location is determined by comparing the potential leak locations for $A_i^{eff\_nom}$ and $A_i^{eff\_nom}$ at box 66. Essentially, if the stored leak flow values from the box 54 and the box 66 are substantially different then the leak is determined to be at the anode outlet. If the stored leak values from the box 54 and the box 66 are not substantially different then it is determined that the leak is at the anode inlet. This comparison to determine the leak location works best if the anode concentration at the box 54 is lower than at the box 66. The leak detection is less reliable at high power where estimation errors may be large. Thus, the controller 44 may repeat the leak detection algorithm using a lower hydrogen concentration for the leak value at the box 54 to improve the leak estimate.

Once the leak location and the effective area of the leak $A_i^{eff}$ are determined a model may be used to estimate the leak at various operating conditions during fuel cell stack run time so that the information can feed other models an appropriate leak signal. For example, the effect of the leak on the nitrogen model can be quantified. Remedial actions based on the leak rate can be more specific for the location of interest using the algorithm discussed above. For example, if the leak is to the ambient environment there is no need to increase cathode flow to dilute the anode leak.

Figure 3:
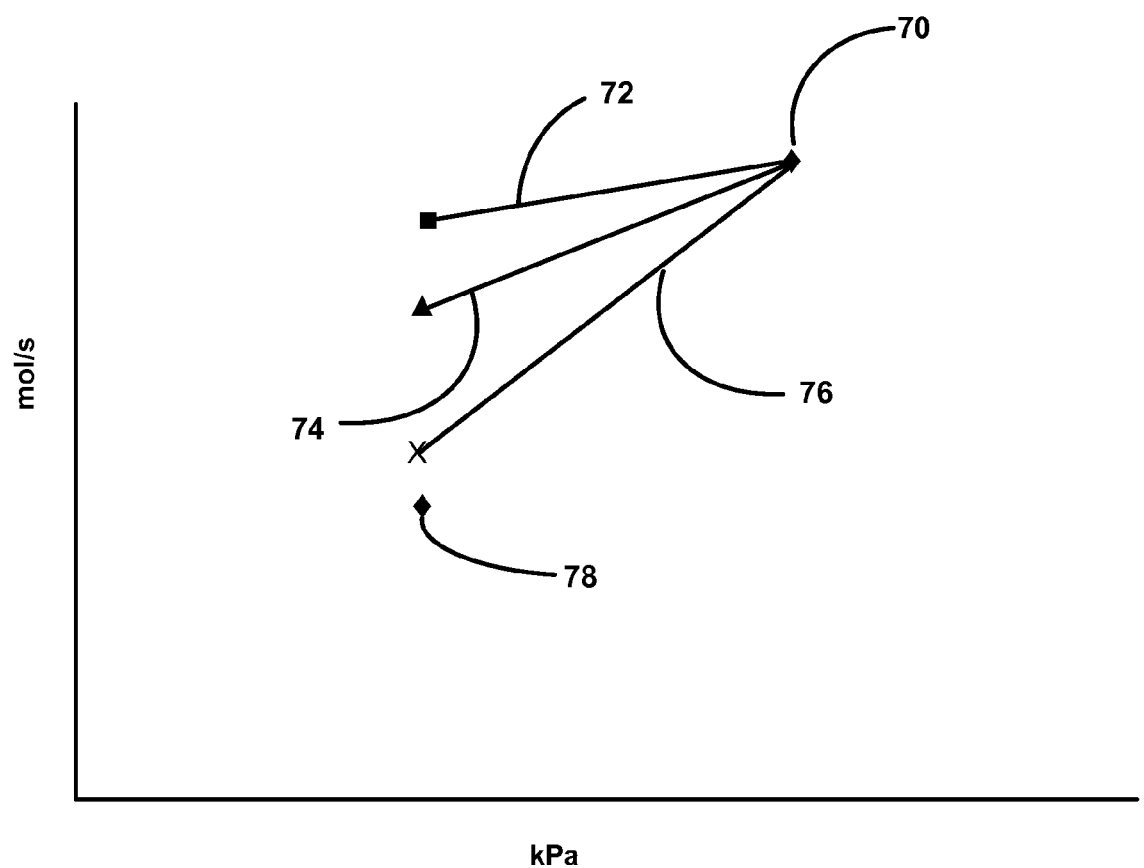
FIG. 3 is a graph with anode pressure on the horizontal axis and anode leak flow on the vertical axis.

FIG. 3 is a graph with anode pressure in kPa on the horizontal axis and anode leak flow in moles/second on the vertical axis. FIG. 3 shows a typical response from the algorithm discussed above. The pressure bias between the anode and the cathode inlet is held fixed between two reference points so that a small change is all that is expected. Line 72 is a cathode inlet model, line 74 is a cathode outlet flow model and line 76 is an ambient model. At point 70 each of lines 72, 74 and 76 converge because they are calculated to match. However, when the lines 72, 74 and 76 are extrapolated back to a lower anode pressure, the line 76 matches best with point 78. Thus, it can be assumed that the anode leak outlet location is the ambient environment according to the data given in FIG. 3.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether one of at least three possible locations in an anode sub-system of a fuel cell system is leaking, said method comprising:
   determining there is a leak in the anode sub-system of the fuel cell system;
   determining a first leak flow value defining a leak rate of the leak during first system operating parameters;
   estimating a first effective leak area using the first leak flow value and the first system operating parameters for each of the three possible leak locations;
   determining a second leak flow value defining a leak rate of the leak during second system operating parameters, said second system operating parameters including an increased cathode airflow to a fuel cell stack that is greater than a cathode airflow to the fuel cell stack during the first system operating parameters;
   estimating a second effective leak area using the second leak flow value and the second system operating parameters for each of the three possible leak locations;
   comparing the first effective leak area to the second effective leak area for each of the three possible leak locations; and
   determining which of the three possible locations the leak may be occurring based on the difference between the first effective leak area and the second effective leak area for each location.

2. The method according to claim 1 wherein the three possible leak locations are anode inlet to cathode outlet, anode outlet to cathode inlet and anode to ambient environment.

3. The method according to claim 1 further comprising increasing a hydrogen input concentration to the fuel cell stack, determining a third leak flow value defining a leak rate of the leak during the increased hydrogen input concentration, comparing the third leak flow value to the first leak flow value, and determining that the leak is occurring at an anode outlet or an anode inlet based on a difference between the first leak flow value and the third leak flow value.

4. The method according to claim 1 further comprising taking remedial actions for mitigating the leak.

5. A method for determining whether one of three possible locations in an anode sub-system of a fuel cell system is leaking, said possible leak locations including anode inlet to cathode outlet, anode outlet to cathode inlet and anode to ambient environment, said method comprising:
  determining there is a leak in the anode sub-system of the fuel cell system;
  determining a first leak flow value defining a leak rate of the leak during first system operating parameters;
  estimating a first effective leak area using the first leak flow value and the first system operating parameters for each of the three possible leak locations;
  determining a second leak flow value defining a leak rate of the leak during second system operating parameters, said second system operating parameters including an increased cathode airflow to a fuel cell stack that is greater than a cathode airflow to the fuel cell stack during the first system operating parameters;
  estimating a second effective leak area using the second leak flow value and the second system operating parameters for each of the three possible leak locations;
  comparing the first effective leak area to the second effective leak area for each of the three possible leak locations;
  determining which of the three possible locations the leak may be occurring based on the difference between the first effective leak area and the second effective leak area for each location;
  increasing a hydrogen input concentration to the fuel cell stack;
  determining a third leak flow value defining a leak rate of the leak during the increased hydrogen input concentration;
  comparing the third leak flow value to the first leak flow value; and
  determining that the leak is occurring at an anode outlet or an anode inlet based on a difference between the first leak flow value and the third leak flow value.

6. The method according to claim 5 further comprising taking remedial actions for mitigating the leak.

7. A control system for determining whether one of at least three possible locations in an anode sub-system of a fuel cell system is leaking, said control system comprising:
  a controller programmed with:
    means for determining there is a leak in the anode sub-system of the fuel cell system;
    means for determining a first leak flow value defining a leak rate of the leak during first system operating parameters;
    means for estimating a first effective leak area using the first leak flow value and the first system operating parameters for each of the three possible leak locations;
    means for determining a second leak flow value defining a leak rate of the leak during second system operating parameters, said second system operating parameters including an increased cathode airflow to a fuel cell stack that is greater than a cathode airflow to the fuel cell stack during the first system operating parameters;
    means for estimating a second effective leak area using the second leak flow value and the second system operating parameters for each of the three possible leak locations;
    means for comparing the first effective leak area to the second effective leak area for each of the three possible leak locations; and
    means for determining which of the three possible locations the leak may be occurring based on a difference between the first effective leak area and the second effective leak area for each location.

8. The method according to claim 1 wherein the first and second effective leak areas are estimated using:

$$A_i^{\text{eff}} = \frac{\sqrt{Mw_{AnOut}} \cdot \dot{n}_{Leak}}{P_{AnIn} \cdot \sqrt{\left(\frac{2 \cdot L2m^3}{R(T_{CoolIn} + C2K)}\right)\left(\frac{k}{k-1}\right)\left[\left(\frac{P}{P_{AnIn}}\right)^{2/k} - \left(\frac{P}{P_{AnIn}}\right)^{(k+1)/k}\right]}}$$

where $A_i^{\text{eff}}$ is the effective leak area, i represents the particular possible leak location, P represents a pressure at the possible leak location, $Mw_{AnOut}$ is the molecular weight of an anode outlet gas, $\dot{n}_{Leak}$ is the rate of the leak, $P_{AnIn}$ is the pressure in the anode sub-system, R is the ideal gas constant, $T_{CoolIn}$ is the temperature (K) of coolant in the stack, C2K is a conversion factor from Celsius to Kelvin, L2 m³ is a conversion factor from liters to cubic meters, and k is the ratio of specific heat.

9. The method according to claim 5 wherein the first and second effective leak areas are estimated using:

$$A_i^{\text{eff}} = \frac{\sqrt{Mw_{AnOut}} \cdot \dot{n}_{Leak}}{P_{AnIn} \cdot \sqrt{\left(\frac{2 \cdot L2m^3}{R(T_{CoolIn} + C2K)}\right)\left(\frac{k}{k-1}\right)\left[\left(\frac{P}{P_{AnIn}}\right)^{2/k} - \left(\frac{P}{P_{AnIn}}\right)^{(k+1)/k}\right]}}$$

where $A_i^{\text{eff}}$ is the effective leak area, i represents the particular possible leak location, P represents a pressure at the possible leak location, $Mw_{AnOut}$ is the molecular weight of an anode outlet gas, $\dot{n}_{Leak}$ is the rate of the leak, $P_{AnIn}$ is the pressure in the anode sub-system, R is the ideal gas constant, $T_{CoolIn}$ is the temperature (K) of coolant in the stack, C2K is a conversion factor from Celsius to Kelvin, L2 m³ is a conversion factor from liters to cubic meters, and k is the ratio of specific heat.

10. The system according to claim 7 wherein the first and second effective leak areas are estimated using:

$$A_i^{\text{eff}} = \frac{\sqrt{Mw_{AnOut}} \cdot \dot{n}_{Leak}}{P_{AnIn} \cdot \sqrt{\left(\frac{2 \cdot L2m^3}{R(T_{CoolIn} + C2K)}\right)\left(\frac{k}{k-1}\right)\left[\left(\frac{P}{P_{AnIn}}\right)^{2/k} - \left(\frac{P}{P_{AnIn}}\right)^{(k+1)/k}\right]}}$$

where $A_i^{\text{eff}}$ is the effective leak area, i represents the particular possible leak location, P represents a pressure at the possible leak locations, $Mw_{AnOut}$ is the molecular weight of an anode outlet gas, $\dot{n}_{Leak}$ is the rate of the leak, $P_{AnIn}$ is the pressure in the anode sub-system, R is the ideal gas constant, $T_{CoolIn}$ is the temperature (K) of coolant in the stack, C2K is a conversion factor from Celsius to Kelvin, L2 m$^3$ is a conversion factor from liters to cubic meters, and k is the ratio of specific heat.

11. The system according to claim 7 wherein the three potential possible leak locations are anode inlet to cathode outlet, anode outlet to cathode inlet and anode to ambient environment.

12. The system according to claim 7 further comprising means for increasing a hydrogen input concentration to the fuel cell stack, means for determining a third leak flow value defining a leak rate of the leak during the increased hydrogen input concentration, means for comparing the third leak flow value to the first leak flow value, and means for determining that the leak is occurring at an anode outlet or an anode inlet based on a difference between the first leak flow value and the third leak flow value.

13. The method according to claim 1 further comprising estimating the leak rate of the leak during multiple system operating conditions using a model based on the determined location of the leak and the estimated effective leak area for that location.

14. The method according to claim 5 further comprising estimating the leak rate of the leak during multiple system operating conditions using a model based on the determined location of the leak and the estimated effective leak area for that location.

15. The system according to claim 7 further comprising means for estimating the leak rate of the leak during multiple system operating conditions using a model based on the determined location of the leak and the estimated effective leak area for that location.

* * * * *